(12) United States Patent
Horiba et al.

(10) Patent No.: US 12,738,500 B2
(45) Date of Patent: Sep. 15, 2026

(54) BINDER FOR POSITIVE ELECTRODE OF LITHIUM ION BATTERY, SLURRY FOR FORMING POSITIVE ELECTRODE MIXTURE LAYER OF LITHIUM ION BATTERY, POSITIVE ELECTRODE FOR LITHIUM ION BATTERY, AND LITHIUM ION BATTERY

(71) Applicants: Tokyo University of Science Foundation, Tokyo (JP); TOSOH CORPORATION, Shunan (JP)

(72) Inventors: Tatsuo Horiba, Tokyo (JP); Kei Kubota, Tokyo (JP); Yoshinari Abe, Tokyo (JP); Asako Oishi, Tokyo (JP); Shinichi Komaba, Tokyo (JP); Hiroshi Inoue, Yokkaichi (JP); Eiichi Tougou, Yokkaichi (JP)

(73) Assignees: Tokyo University of Science Foundation, Tokyo (JP); TOSOH CORPORATION, Shunan (JP)

( * ) Notice: Subject to any disclaimer, the term of this patent is extended or adjusted under 35 U.S.C. 154(b) by 1006 days.

(21) Appl. No.: 17/909,497

(22) PCT Filed: Feb. 25, 2021

(86) PCT No.: PCT/JP2021/007092
§ 371 (c)(1),
(2) Date: Sep. 6, 2022

(87) PCT Pub. No.: WO2021/177134
PCT Pub. Date: Sep. 10, 2021

(65) Prior Publication Data

US 2023/0124539 A1 Apr. 20, 2023

(30) Foreign Application Priority Data

Mar. 6, 2020 (JP) ................................ 2020-038498

(51) Int. Cl.
*H01M 4/62* (2006.01)
*C08B 11/12* (2006.01)
(Continued)

(52) U.S. Cl.
CPC ............ *H01M 4/621* (2013.01); *C08B 11/12* (2013.01); *C08B 37/0084* (2013.01);
(Continued)

(58) Field of Classification Search
CPC ............ H01M 4/621; H01M 10/0525; H01M 2004/028; H01M 4/622; C08B 11/12;
(Continued)

(56) References Cited

U.S. PATENT DOCUMENTS 3,663,284 A * 5/1972 Stancioff .............. C09D 17/008 106/447
6,325,845 B1 * 12/2001 Kurihara ............... C09D 11/18 106/31.86
(Continued)

FOREIGN PATENT DOCUMENTS

CN 109768280 A 5/2019
JP 53-041732 A 4/1978
(Continued)

OTHER PUBLICATIONS

Arlov et al. "Heparin-Like Properties of Sulfated Alginates with Defined Sequences and Sulfation Degrees" Biomacromolecules 2014, 15, 2744-2750 (Year: 2014).*
(Continued)

*Primary Examiner* — Andrew J. Oyer
(74) *Attorney, Agent, or Firm* — Sughrue Mion, PLLC

(57) ABSTRACT

The present invention provides a binder for positive electrode of lithium ion battery which is excellent in workability at the time of producing a positive electrode, is excellent in charge and discharge characteristics such as cycle charac-
(Continued)

teristics and rate characteristics, and enables to possible to produce a positive electrode having an extended cycle life, as well as the present invention provides a slurry for forming positive electrode mixture layer of lithium ion battery, a positive electrode for lithium ion battery, and a lithium ion battery, using the same. As a binder for binding a positive electrode active material, a conductive aid and a current collector at a positive electrode of a lithium ion battery, by using one containing a polysaccharide introduced with at least one ion exchange group selected from the group consisting of sulfate groups and alkali metal sulfate groups, it is possible to provide a lithium ion battery with excellent charge and discharge characteristics and an extended cycle life.

7 Claims, 6 Drawing Sheets

(51) Int. Cl.
*C08B 37/00* (2006.01)
*H01M 4/02* (2006.01)
*H01M 10/0525* (2010.01)

(52) U.S. Cl.
CPC ... *C08B 37/0096* (2013.01); *H01M 2004/028* (2013.01); *H01M 10/0525* (2013.01)

(58) Field of Classification Search
CPC ... C08B 37/0084; C08B 37/0096; C08B 5/14; C08L 1/16; C08L 5/04; Y02E 60/10
See application file for complete search history.

(56) References Cited

U.S. PATENT DOCUMENTS

| | | | | |
|---|---|---|---|---|
| 6,406,204 | B1 * | 6/2002 | Omatsu | C09D 11/18 401/141 |
| 2002/0033117 | A1 * | 3/2002 | Inoue | C09D 5/36 106/404 |
| 2007/0298321 | A1 | 12/2007 | Jouanneau-Si Larbi et al. | |
| 2014/0011080 | A1 | 1/2014 | Lee et al. | |
| 2025/0135449 | A1 * | 5/2025 | Inoue | B01J 45/00 |

FOREIGN PATENT DOCUMENTS

| | | | |
|---|---|---|---|
| JP | 10-092415 | A | 4/1998 |
| JP | 2001-015114 | A | 1/2001 |
| JP | 2003-068292 | A | 3/2003 |
| JP | 2008-027904 | A | 2/2008 |
| JP | 2011-159484 | A | 8/2011 |
| JP | 2012-094498 | A | 5/2012 |
| JP | 2014-096238 | A | 5/2014 |
| JP | 2014-195018 | A | 10/2014 |
| JP | 2015-191862 | A | 11/2015 |
| JP | 6808208 | B1 | 1/2021 |
| KR | 10-2014-0005079 | A | 1/2014 |
| WO | 2012/133120 | A1 | 10/2012 |

OTHER PUBLICATIONS

International Preliminary Report on Patentability with the translation of Written Opinion dated Sep. 6, 2022 from the International Bureau in International Application No. PCT/JP2021/007092.
Øystein Arlov, et al., "Sulfated Alginates as Heparin Analogues: A Review of Chemical and Functional Properties," Molecules, 2017, vol. 22, No. 778, pp. 1-16 (16 pages total).
Extended European Search Report issued Feb. 27, 2024 in Application No. 21764396.4.
Myung-Hyun Ryou, et al. "Improved Cycle Lives of $LiMn_2O_4$ cathodes in lithium ion batteries by an alginate biopolymer from seaweed", Journal of Materials Chemistry A, 2013, vol. 1, pp. 15224-15229 (6 pages).
English Translation of JP2012-94498A published May 17, 2012, previously cited Sep. 6, 2022.
Chinese Office Action dated Jun. 5, 2025 in Application No. 202180019172.1.
Kamil Jasso et al., "Organic Binder for the Lithium-Sulfur Batteries", ECS Transactions, 2018, pp. 93-97, vol. 87, No. 1.
Asako Oishi et al., "Electrochemical properties of 5 V-class spinel oxide with substituted alginate-based binder", Lecture Abstracts of the 87th ECSJ Spring Meeting, Mar. 3, 2020, pp. 1-4.
International Search Report of PCT/JP2021/007092 dated May 25, 2021 [PCT/ISA/210].

* cited by examiner

[Fig. 1]
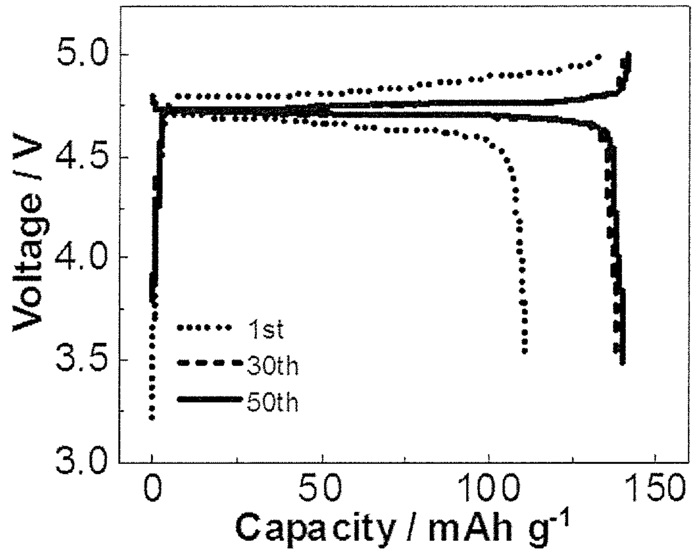
[Fig 2]
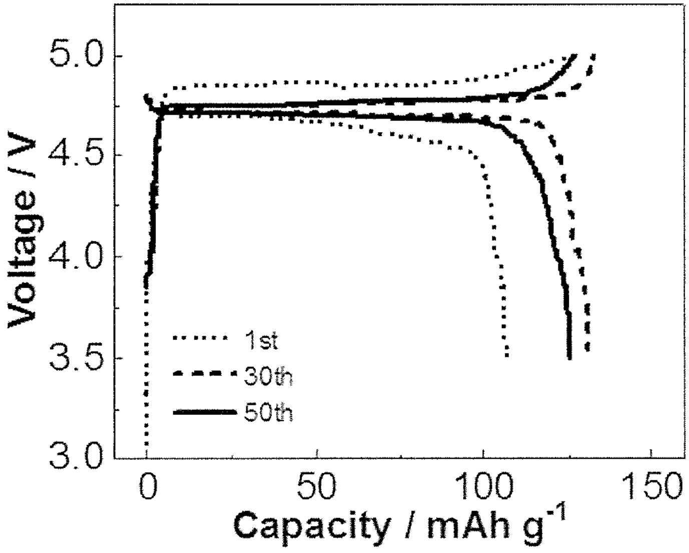

[Fig. 3]
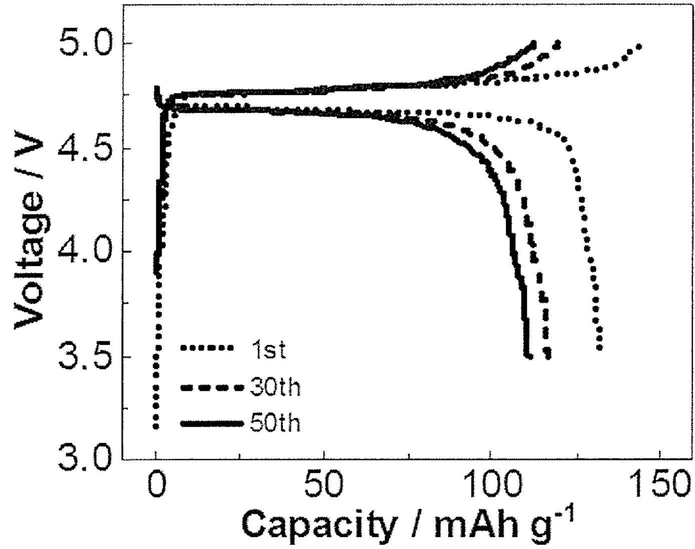
[Fig. 4]
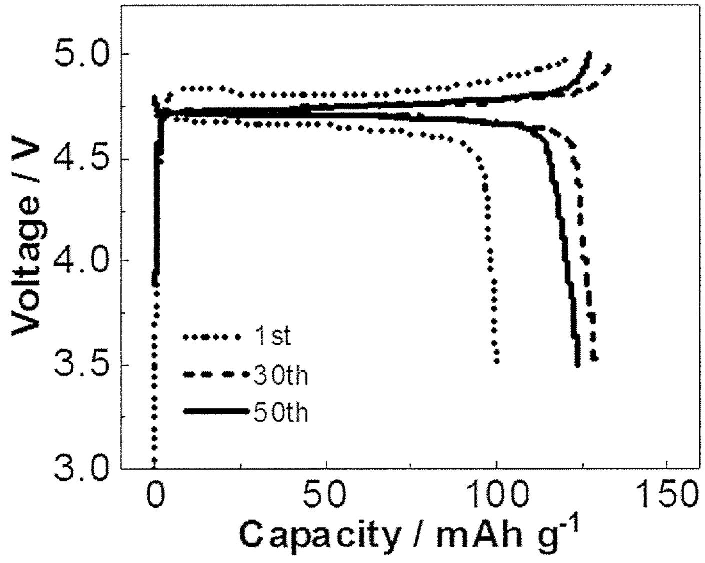

[Fig. 5]
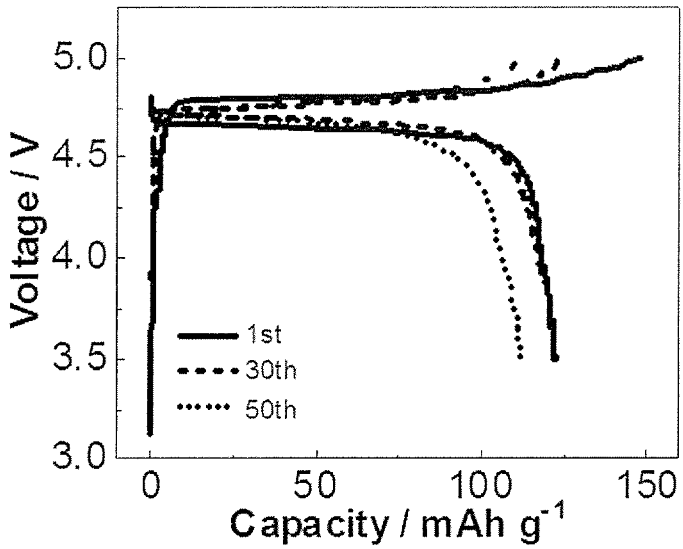
[Fig. 6]
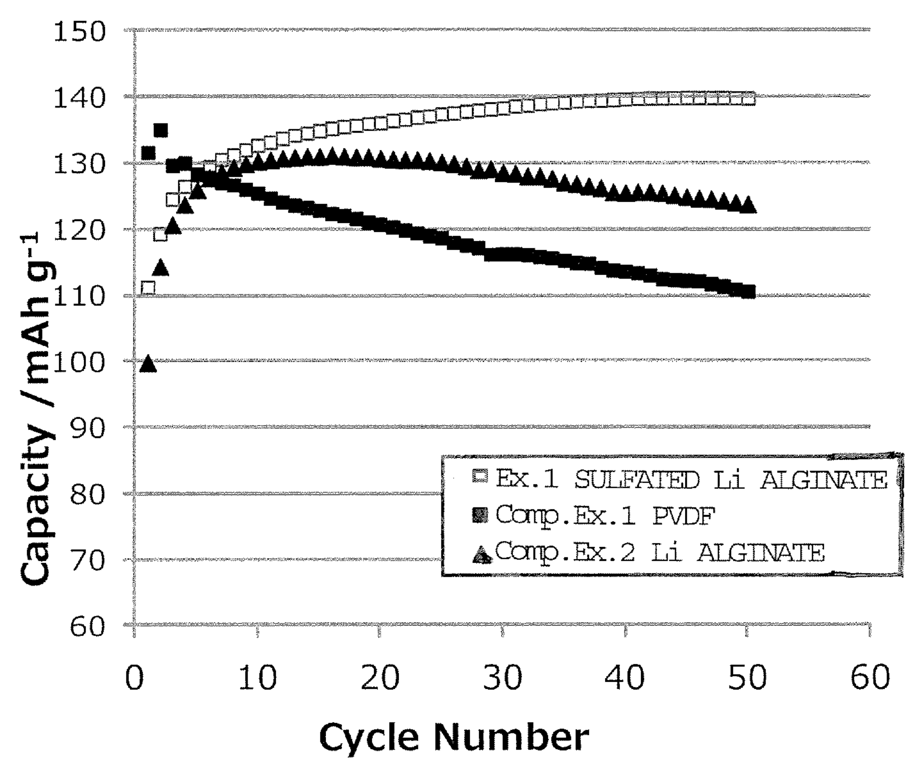

[Fig. 7]
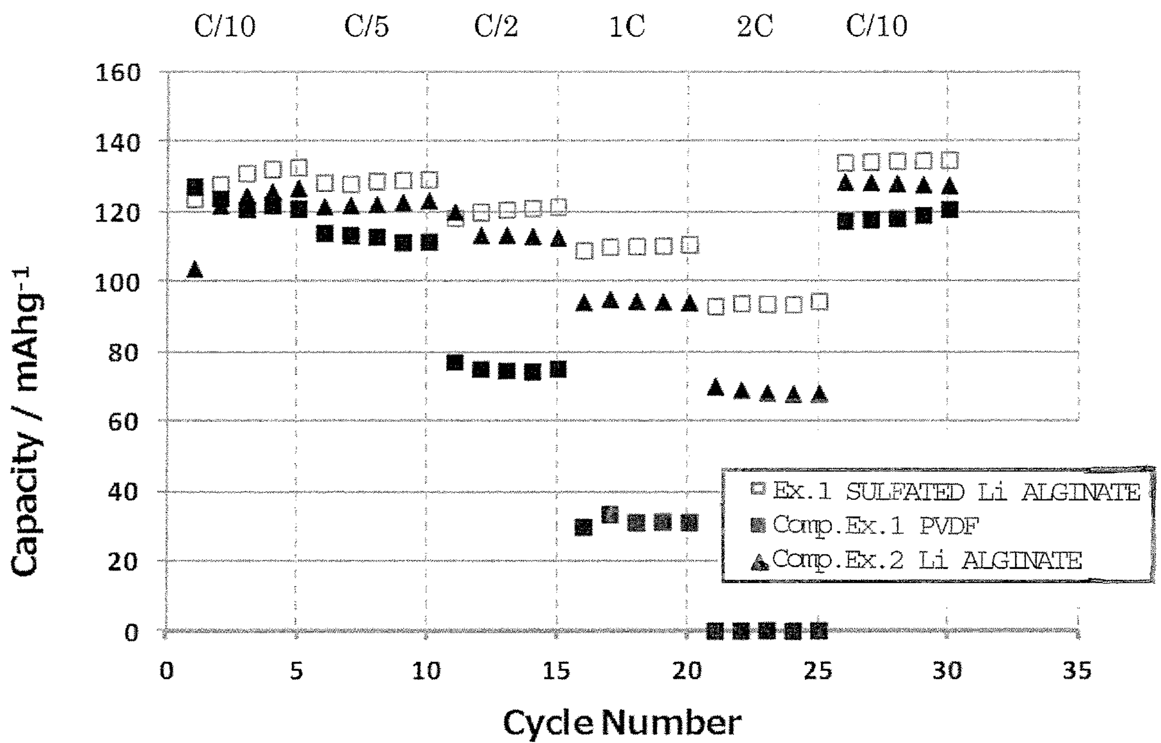
[Fig. 8]
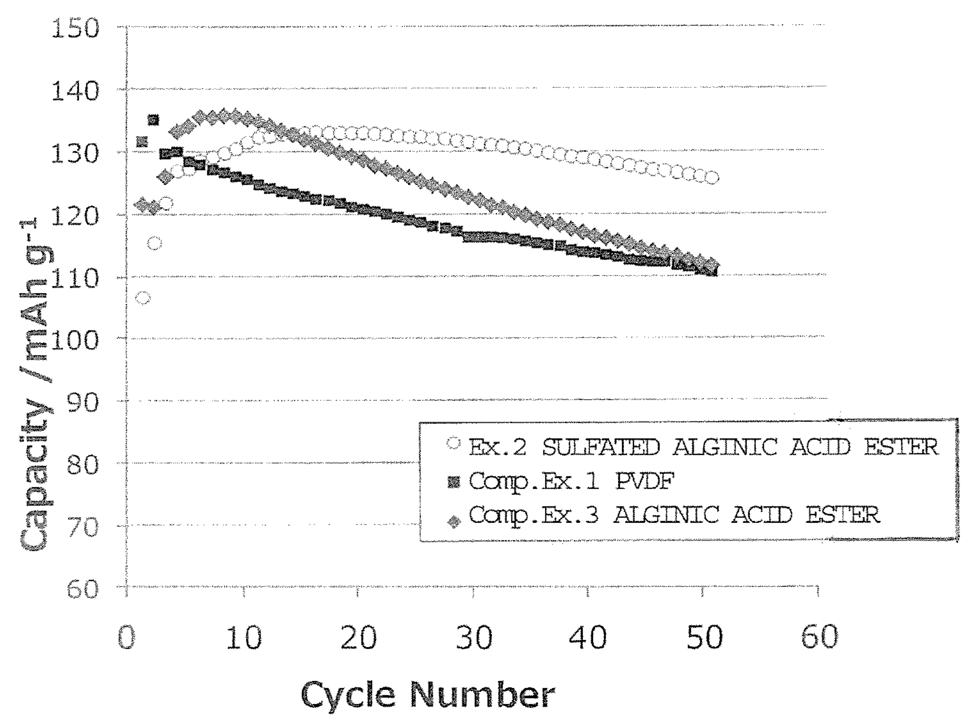

[Fig. 9]
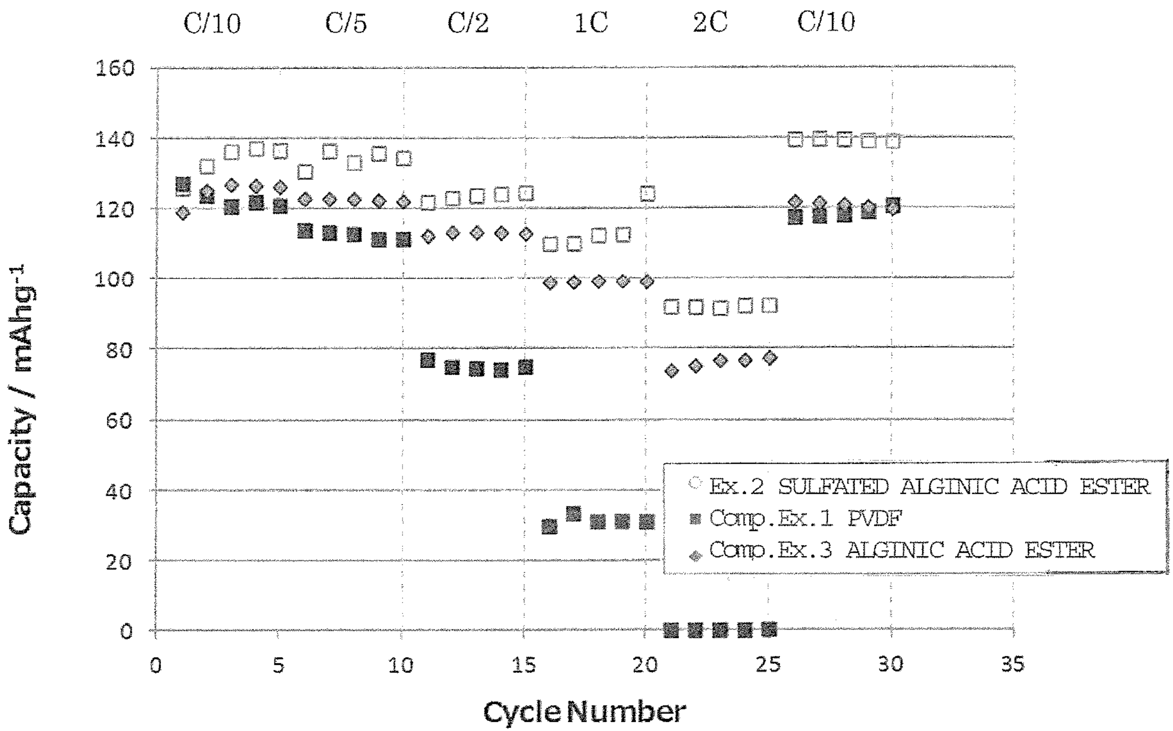
[Fig. 10]
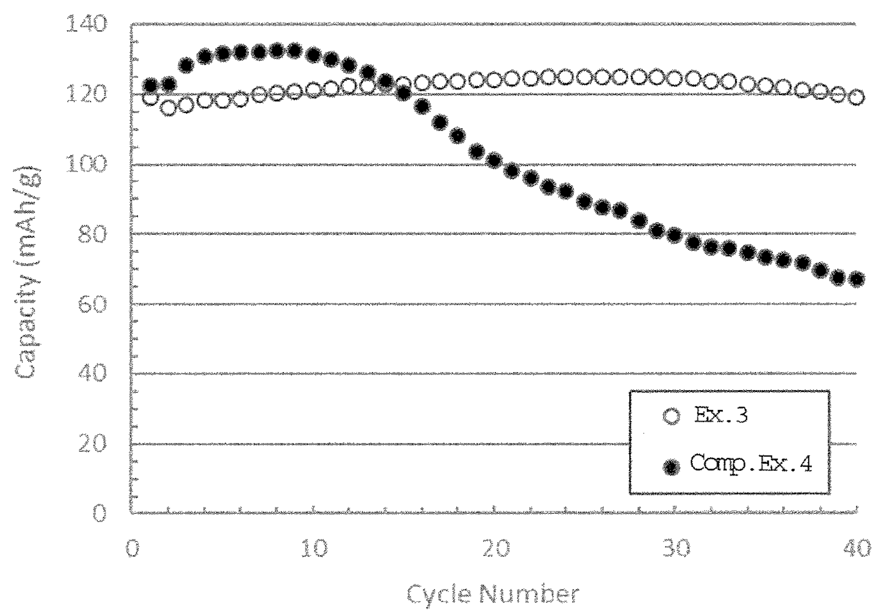

[Fig. 11]
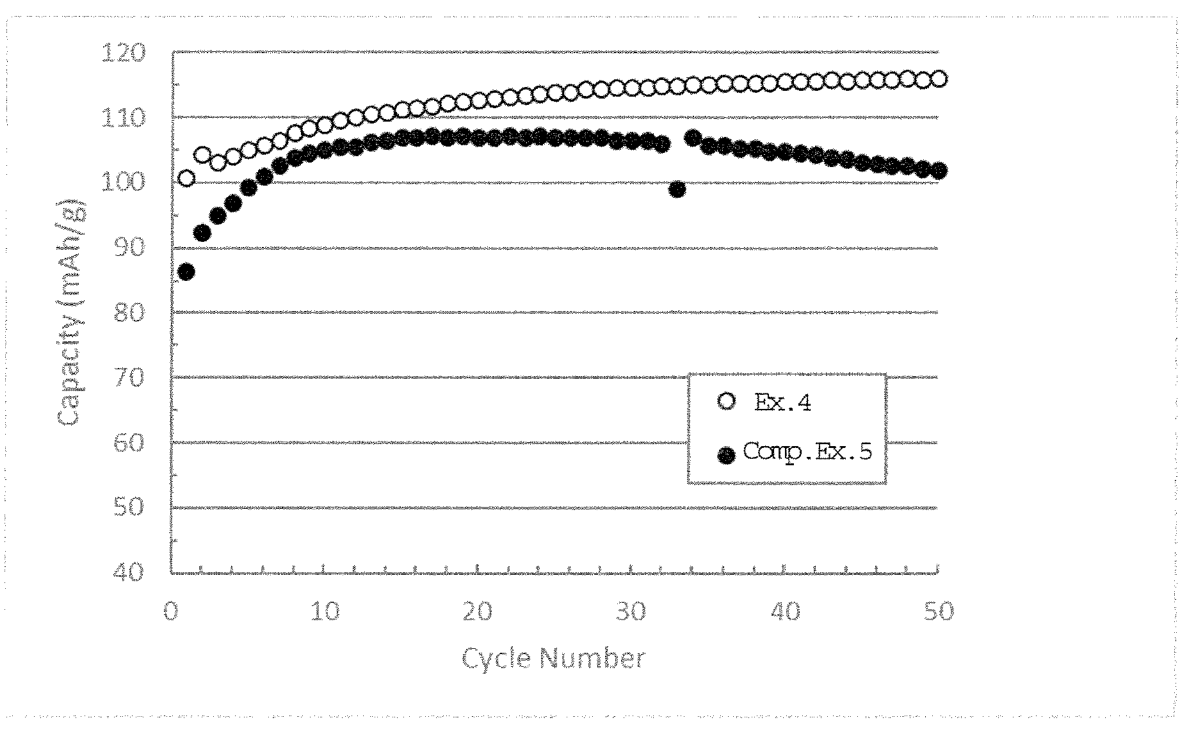
[Fig. 12]
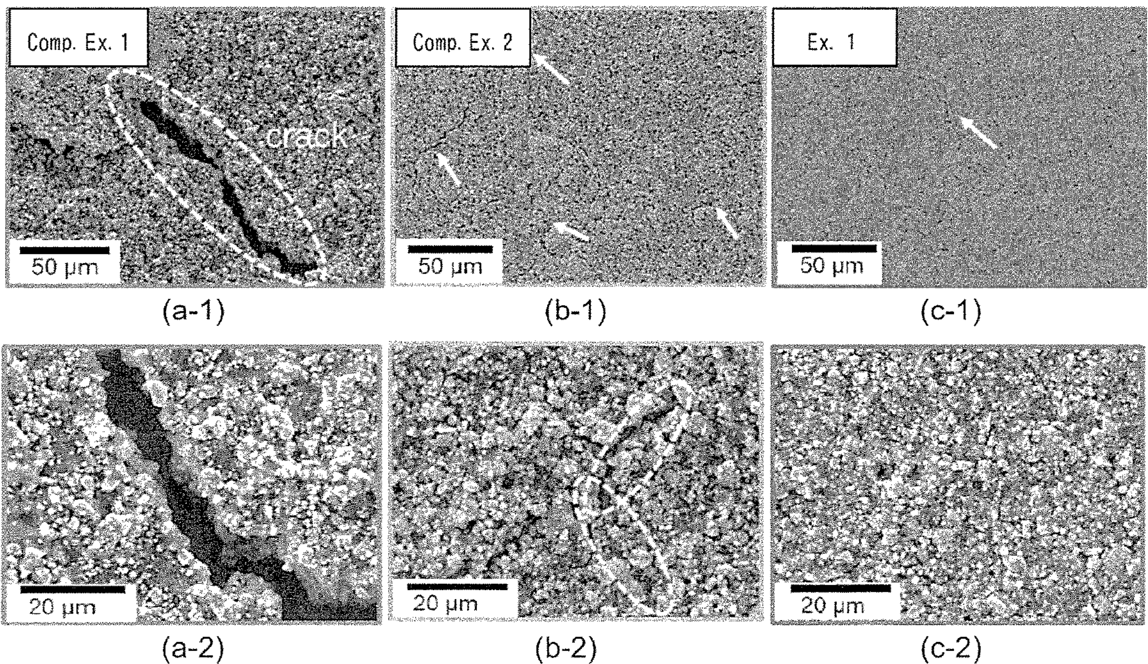
(a-1) (b-1) (c-1)
(a-2) (b-2) (c-2)

BINDER FOR POSITIVE ELECTRODE OF LITHIUM ION BATTERY, SLURRY FOR FORMING POSITIVE ELECTRODE MIXTURE LAYER OF LITHIUM ION BATTERY, POSITIVE ELECTRODE FOR LITHIUM ION BATTERY, AND LITHIUM ION BATTERY

CROSS REFERENCE TO RELATED APPLICATIONS

This application is a National Stage of International Application No. PCT/JP2021/007092, filed Feb. 25, 2021, claiming priority to Japanese Patent Application No. 2020-038498, filed Mar. 6, 2020.

TECHNICAL FIELD

The present invention relates to a binder for positive electrode of lithium ion battery, a slurry for forming positive electrode mixture layer of lithium ion battery, a positive electrode for lithium ion battery, and a lithium ion battery.

BACKGROUND ART

Lithium-ion batteries have been widely used as a power source for electric devices and the like in recent years. Further, recently, their use is expanding as a power source for electric vehicles as well, and high safety is required along with improvement of characteristics such as high capacity, high output, and improvement of cycle life.

It is known that the positive electrode of a lithium ion battery has a structure in which a porous body containing a powdery positive electrode active material, a conductive aid and a binder as main components are stacked and bonded on a current collector, and its performance is greatly affected not only by the characteristics of the positive electrode active material but also by the type of the binder.

Conventionally, polyvinylidene fluoride (PVDF) has been the mainstream as a binder for positive electrodes, but it has drawbacks that since an organic solvent is used in the electrode manufacturing process, detoxification equipment is required in the slurry preparation process and the electrode sheet coating process, and a solvent collecting facility is required in the electrode sheet drying process, and that since the adhesive strength of PVDF to the active material is low, the amount of binder added increases.

Meanwhile, disclosed water-based binders that can be dispersed and dissolved in water without using an organic solvent include the use of polyvinyl alcohol and methyl cellulose (see, for example, PTL 1), the use of xanthan gum (see, for example, PTL 2), the use of starch-type polysaccharides such as amylose and amylopectin (see, for example, PTLs 3 and 4), and the use of alginic acid and alginic acid derivatives (see, for example, PTLs 5, 6, 7, 8, and 9). Water-based binders are preferable because they do not require detoxification equipment when manufacturing electrode sheets and the working environment is also good, but are problematic because depending on the combination of the active material and the binder, the adhesive strength to the active material may decrease.

Further, lithium composite oxides such as $LiMn_2O_4$, $LiNi_{0.5}Mn_{1.5}O_4$, and $LiMn_{0.2}Ni_{0.6}Co_{0.2}O_2$ are often used as positive electrode active materials, and it is known that in the case of these lithium composite oxides are used, manganese and the like in the active material are dissolved and ionized during charging and discharging, and precipitate and deposit on the negative electrode, resulting in deterioration of cycle characteristics and rate characteristics.

CITATION LIST

Patent Literature

[PTL 1] Japanese Unexamined Patent Application Publication No. Sho 53-41732
[PTL 2] Japanese Unexamined Patent Application Publication No. 2003-68292
[PTL 3] Japanese Unexamined Patent Application Publication No. 2008-27904
[PTL 4] International Publication No. WO2012/133120
[PTL 5] Japanese Unexamined Patent Application Publication No. Hei 10-92415
[PTL 6] Japanese Unexamined Patent Application Publication No. 2001-15114
[PTL 7] Japanese Unexamined Patent Application Publication No. 2014-96238
[PTL 8] Japanese Unexamined Patent Application Publication No. 2014-195018
[PTL 9] Japanese Unexamined Patent Application Publication No. 2015-191862

SUMMARY OF INVENTION

Technical Problem

An object of the present invention is to provide a binder for positive electrode of lithium ion battery which is excellent in workability at the time of producing a positive electrode, is excellent in charge and discharge characteristics such as cycle characteristics and rate characteristics, and enables to possible to produce a positive electrode having an extended cycle life, as well as to provide a slurry for forming positive electrode mixture layer of lithium ion battery, a positive electrode for lithium ion battery, and a lithium ion battery, using the same.

Solution to Problem

The present inventors have made diligent studies to achieve the above object, and have found as a result that the above object can be achieved by using a polysaccharide having at least one ion exchange group selected from the group consisting of sulfate groups and alkali metal sulfate groups as a positive electrode binder. Thus, the present invention has been completed.

The aspects of the present invention are [1] to [8] shown below.

[1] A binder for positive electrode of lithium ion battery which is a binder for binding a positive electrode active material, a conductive aid and a current collector at a positive electrode of a lithium ion battery, comprising:
a polysaccharide having at least one ion exchange group selected from the group consisting of sulfate groups and alkali metal sulfate groups.

[2] The binder according to the above [1], wherein a weight average molecular weight of the polysaccharide having the ion exchange group is 10,000 to 1,000,000, and the amount of the ion exchange group introduced into the polysaccharide is 1.0 to 6.0 mmol/g.

[3] The binder according to the above [1] or [2], wherein the polysaccharide is at least one selected from the group consisting of amylose, amylopectin, carboxymethyl cellulose, guar gum, gellan gum, xanthan gum, arabic gum, alginic acid, alginates, alginic acid ester, agarose, carrageenan, and chondroitin sulfate.

[4] The binder according to any one of the above [1] to [3], wherein the polysaccharide having the ion exchange group is at least one selected from the group consisting of sulfated alginic acid, sulfated alginate alkali metal salts, sulfated alginic acid ester, sulfated alginic acid ester alkali metal salts, sulfated carboxymethyl cellulose, sulfated carboxymethyl cellulose alkali metal salts, sulfated guar gum, and sulfated guar gum alkali metal salts.

[5] The binder according to any one of the above [1] to [4], wherein the polysaccharide having the ion exchange group has a structure represented by the following general formula (1)

[Chem. 1]

(1)

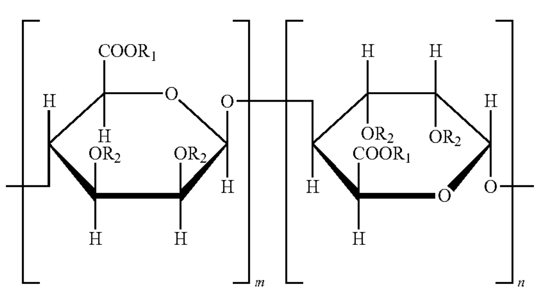

(in the formula, m and n each independently represent integers of 1 or more, $R_1$'s may be the same or different and each represent one selected from the group consisting of a hydrogen atom, alkali metals, alkaline earth metals, and groups represented by —$R_3$— O—$R_2$, and $R_3$ represents a divalent hydrocarbon group having 2 to 6 carbon atoms, $R_2$'s may be the same or different and each represent one selected from the group consisting of a hydrogen atom and groups represented by —$SO_3M$ (M represents one selected from the group consisting of a hydrogen atom and alkali metals), and at least one of $R_2$'s is the group represented by —$SO_3M$).

[6] A slurry for forming positive electrode mixture layer of lithium ion battery, comprising: a positive electrode active material, a conductive aid, the binder according to any one of the above [1] to [5], and water.

[7] A positive electrode for lithium ion battery, comprising: the binder according to any one of the above [1] to [5].

[8] A lithium ion battery comprising: the positive electrode for lithium ion battery according to the above [7].

Regarding the reason why the above object is achieved with the binder for positive electrode of lithium ion battery of the present invention, the present inventors infer as follows.

In the present invention, the use of a polysaccharide having at least one ion exchange group selected from the group consisting of sulfate groups and alkali metal sulfate groups for the positive electrode binder leads to exhibiting the effects of improving the adhesiveness between the positive electrode active material or the conductive aid and the current collector, improving the affinity between the binder and the electrolytic solution, and suppressing the precipitation and deposition on the negative electrode by the ion exchange group capturing manganese ions and the like eluted from the positive electrode active material in the vicinity of the positive electrode, making it possible to achieve excellent charge and discharge characteristics and an extended cycle life.

Further, the polysaccharide having the ion exchange group used in the binder for a positive electrode in the present invention not only has excellent adhesiveness to the positive electrode active material and the current collector, but also has high strength, toughness, and flexibility so that it can follow the volume change of the positive electrode at the time of charging and discharging, making it possible to prevent the positive electrode from cracking, the active material from peeling or falling off, and the conductive channel from being broken, each of which may be caused by the volume change. Therefore, when it is used as the binder for positive electrode of lithium ion battery, the resultant lithium ion battery has excellent charge and discharge characteristics and an extended cycle life. Further, by introducing the ion exchange group into the polysaccharide, the affinity with the electrolytic solution is improved, making it possible to achieve enhanced performance of the lithium ion battery.

Furthermore, since sulfate groups and the alkali metal sulfate groups are strongly acidic cation exchange groups, they have a high effect of capturing transition metal ions such as manganese, and thus can capture manganese ions and the like eluted from the positive electrode active material in the vicinity of the positive electrode, making it possible to suppress precipitation and deposition on the negative electrode. As a result, excellent charge and discharge characteristics and an extended cycle life can be achieved.

Advantageous Effects of Invention

The present invention makes it possible to provide a binder for positive electrode of lithium ion battery and a slurry for forming positive electrode mixture layer of lithium ion battery, which are excellent in workability at the time of producing a positive electrode, is excellent in charge and discharge characteristics such as cycle characteristics and rate characteristics, and enables to produce a positive electrode having an extended cycle life, and furthermore, the use thereof makes it possible to provide a positive electrode for lithium ion battery and a lithium ion battery having excellent charge and discharge characteristics and an extended cycle life.

BRIEF DESCRIPTION OF DRAWINGS

FIG. 1 is a graph showing a charge and discharge curve of a coin cell obtained in Example 1.

FIG. 2 is a graph showing a charge and discharge curve of a coin cell obtained in Example 2.

FIG. 3 is a graph showing a charge and discharge curve of a coin cell obtained in Comparative Example 1.

FIG. 4 is a graph showing a charge and discharge curve of a coin cell obtained in Comparative Example 2.

FIG. 5 is a graph showing a charge and discharge curve of a coin cell obtained in Comparative Example 3.

FIG. 6 is a graph comparing the charge and discharge cycle characteristics of the coin cells obtained in Example 1, Comparative Example 1, and Comparative Example 2.

FIG. 7 is a graph comparing the rate characteristics of the coin cells obtained in Example 1, Comparative Example 1, and Comparative Example 2.

FIG. 8 is a graph comparing the charge and discharge cycle characteristics of the coin cells obtained in Example 2, Comparative Example 1, and Comparative Example 3.

FIG. 9 is a graph comparing the rate characteristics of the coin cells obtained in Example 2, Comparative Example 1, and Comparative Example 3.

FIG. 10 is a graph comparing the charge and discharge cycle characteristics of the coin cells obtained in Example 3 and Comparative Example 4.

FIG. 11 is a graph comparing the charge and discharge cycle characteristics of the coin cells obtained in Example 4 and Comparative Example 5.

FIG. 12 shows SEM images of the positive electrode surfaces for Comparative Example 1 (a-1 and a-2), Comparative Example 2 (b-1 and b-2), and Example 1 (c-1 and c-2) after a 50-cycle test in a cycle characteristic test, where a-1, b-1 and c-1 have a magnification of 500 times, and a-2, b-2 and c-2 have a magnification of 1500 times.

DESCRIPTION OF EMBODIMENTS

Hereinafter, the present invention is described in detail according to preferred embodiments thereof.

A binder for positive electrode of lithium ion battery according to an aspect of the present invention contains a polysaccharide having at least one ion exchange group selected from the group consisting of sulfate groups and alkali metal sulfate groups.

The polysaccharide refers to a structure in which a large number of monosaccharides are linked by glycosidic bonds, and the polysaccharide having the ion exchange group (sulfate group and/or alkali metal sulfate group) contained in the binder of the present invention includes those in which at least some of the hydrogen atoms of the hydroxyl groups contained in the polysaccharide structure is substituted with $—SO_3H$ (sulfate groups), and further includes those in which the protons of the sulfate groups are ion-exchanged with alkali metal ions (such as lithium ion, sodium ion, or potassium ion).

Examples of polysaccharides include amylose, amylopectin, dextrin, glycogen, cellulose, carboxymethyl cellulose, hydroxyalkyl cellulose, acetyl cellulose, pectin, pullulan, curdlan, chitin, chitosan, agarose, xanthan gum, guar gum, gellan gum, locust bean gum, gum arabic, tamarind seed gum, psyllium seed gum, carrageenan, alginic acid, alginates, alginic acid ester, heparin, hyaluronic acid, chondroitin sulfate, xyloglucan, glucomannan, and the like. Among these, neutral polysaccharides and acidic polysaccharides are preferably used in the present invention. Specific examples include amylose, amylopectin, carboxymethyl cellulose, guar gum, gellan gum, xanthan gum, gum arabic, alginic acid, alginates, alginic acid ester, agarose, carrageenan, and chondroitin sulfate, and among these, alginic acid, alginates, alginic acid ester, carboxymethyl cellulose, and guar gum are preferable. More preferably, alginic acid, alginates, and alginic acid ester, which are represented by the following general formula (2) are preferably used:

[Chem. 2]

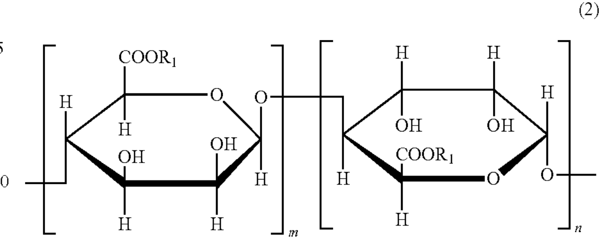

(in the formula, m and n each independently represent integers of 1 or more, $R_1$'s may be the same or different and each represent one selected from the group consisting of a hydrogen atom, alkali metals, alkaline earth metals, and groups represented by $—R_3—OH$, and $R_3$ represents a divalent hydrocarbon group having 2 to 6 carbon atoms).

Examples of $R_3$, the divalent hydrocarbon groups of having 2 to 6 carbon atoms, include ethylene group, ethylidene group, vinylene group, trimethylene group, methylethylene group, 1-methylethylidene group, propenylene group, tetramethylene group, methyltrimethylene group, dimethylethylene group, 1-ethylethylidene group, ethylethylene group, pentamethylene group, methyltetramethylene group, dimethyltrimethylene group, methylethylethylene group, hexamethylene group, cyclohexylene group, and cyclohexylidene group.

Alginic acid refers to the case where $R_1$'s in the formula (2) are all hydrogen atoms, the alginates refer to the case where at least some of $R_1$'s in the formula (2) are alkali metals (such as lithium, sodium, or potassium) or alkaline earth metals (such as magnesium or calcium), and the alginic acid ester refers to a group in which at least some of $R_1$'s in the formula (2) are represented by $—R_3—OH$ ($R_3$ is a divalent hydrocarbon group having 2 to 6 carbon atoms), and such an alginic acid ester can be produced by reacting alginic acid with an epoxy compound.

The ratio of mannuronic acid and guluronic acid, which are constituents of alginic acid, is arbitrary, and it is possible to use both alginic acid having a high mannuronic acid ratio that produces a flexible gel and alginic acid having a high guluronic acid ratio that can obtain a rigid gel.

The sulfate groups introduced into the polysaccharide are ion exchange groups capable of ion-exchange not only with basic salts but also with neutral salts such as NaCl and $CaCl_2$. The introduction positions of the sulfate groups are the sites of the hydroxyl groups contained in the polysaccharide structure, and the hydrogen atoms of the hydroxyl groups are substituted with $—SO_3H$ and introduced.

The polysaccharide introduced with the above-described ion exchange groups contained in the binder of the present invention is preferably one in which the above-described ion exchange groups (sulfate groups and/or alkali metal sulfate groups) are introduced into at least one polysaccharide selected from the group consisting of amylose, amylopectin, carboxymethyl cellulose, guar gum, gellan gum, xanthan gum, arabic gum, alginic acid, alginates, alginic acid ester, agarose, carrageenan, and chondroitin sulfate, and among these, more preferably at least one selected from the group consisting of sulfated alginic acid, sulfated alginate alkali metal salts, sulfated alginic acid ester, sulfated alginic acid ester alkali metal salts, sulfated carboxymethyl cellulose, sulfated carboxymethyl cellulose alkali metal salts, sulfated guar gum, and sulfated guar gum alkali metal salts.

The polysaccharide having the ion exchange group is particularly preferably one having a structure represented by the following general formula (1)

[Chem. 3]

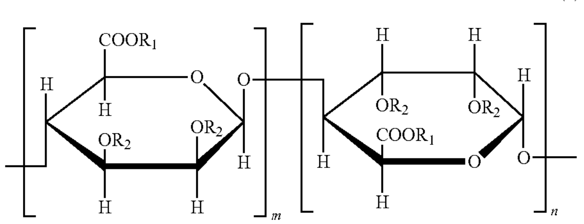

(in the formula, m and n each independently represent integers of 1 or more, $R_1$'s may be the same or different and each represent one selected from the group consisting of a hydrogen atom, alkali metals, alkaline earth metals, and groups represented by —$R_3$—O—$R_2$, and $R_3$ represents a divalent hydrocarbon group having 2 to 6 carbon atoms, $R_2$'s may be the same or different and each represent one selected from the group consisting of a hydrogen atom and groups represented by —$SO_3M$ (M represents one selected from the group consisting of a hydrogen atom and alkali metals), and at least one of $R_2$'s is the group represented by —$SO_3M$).

The amount of the ion exchange groups (sulfate groups and/or alkali metal sulfate groups) introduced into the polysaccharide is preferably 1.0 to 6.0 mmol/g. The amount of the ion exchange groups introduced is preferably in the above range because manganese ions and the like eluted from the positive electrode active material can be efficiently captured in the vicinity of the positive electrode, and further, the binding force to the active material is high, and the affinity with the electrolytic solution is also excellent.

The sulfate groups and alkali metal sulfate groups are strongly acidic cation exchange groups, and thus can efficiently exchange and capture transition metal ions such as manganese ions without being affected by the pH in the system.

The molecular weight of the polysaccharide having the ion exchange group is preferably 10,000 to 1,000,000 in terms of weight average molecular weight. The weight average molecular weight is preferably in the above range because the mechanical properties are good and the slurry viscosity at the time of producing the electrode is also an appropriate value.

Further, m and n in the general formula (1) may be each independently integers of 1 or more, and are preferably selected so that the weight average molecular weight of the polysaccharide represented by the general formula (1) is 10,000 to 1,000,000, and it is preferable that m and n are each independently 30 to 3000.

The method for producing the polysaccharide having an ion exchange group is not particularly limited, and it can be obtained, for example, by reacting the polysaccharide with a sulfated reagent in an aprotic polar solvent. The reaction can be carried out in a slurry system or a uniform system.

The solvent used in the reaction is preferably an aprotic polar solvent, and specific examples thereof include dimethyl sulfoxide, formamide, dimethylformamide, dimethylacetamide, N-methyl-2-pyrrolidone (NMP), 1,3-dimethyl-2-imidazolidinone, acetonitrile, hexamethylphosphoric triamide, tetramethylurea, N,N'-dimethylpropylene urea, tetrahydrofuran, dioxane, pyridine, bipyridine, phenanthroline, and the like.

The polysaccharide used is preferably a polysaccharide having excellent solubility in an aprotic polar solvent, and examples thereof include amylose, amylopectin, dextrin, glycogen, cellulose, carboxymethyl cellulose, hydroxyalkyl cellulose, acetyl cellulose, pectin, pullulan, curdlan, chitin, chitosan, agarose, xanthan gum, guar gum, gellan gum, locust bean gum, gum arabic, tamarind seed gum, psyllium seed gum, carrageenan, alginic acid, alginates, alginic acid ester, heparin, hyaluronic acid, chondroitin sulfate, xyloglucan, glucomannan, and the like, and preferable examples include amylose, amylopectin, carboxymethyl cellulose, guar gum, gellan gum, xanthan gum, arabic gum, alginic acid, alginates, alginic acid ester, agarose, carrageenan, and chondroitin sulfate. More preferable examples of the polysaccharides used include alginic acid, alginates, alginic acid ester, carboxymethyl cellulose, and guar gum, and particularly preferable examples include alginic acid, alginates, and alginic acid ester.

The sulfated reagent used is a reagent that can react with hydroxyl groups to introduce sulfate groups, and specific examples thereof include concentrated sulfuric acid, chlorosulfonic acid, sulfur trioxide pyridine complex, sulfur trioxide trimethylamine complex, sulfur trioxide dimethylformamide complex, sulfur trioxide dimethyl sulfoxide complex, sulfur trioxide dioxane complex, and the like. Among these sulfated reagents, reagents with a small decrease in the molecular weight of polysaccharides are preferably used in the present invention. Preferable sulfated reagents include sulfur trioxide complexes, and particularly preferable sulfated reagents include sulfur trioxide pyridine complexes and sulfur trioxide dimethylformamide complexes. The amount of these sulfated reagents used is not particularly limited, but is preferably in the range of 1 to 5 times the molar amount of the monosaccharide, which is a constituent unit of the polysaccharide. It is preferable to use the sulfated reagent in this range because the amount of sulfated groups introduced is large and the decrease in the molecular weight of the polysaccharide is suppressed, making it possible to obtain a high molecular weight product.

Other reaction conditions can be set arbitrarily. The reaction temperature is preferably selected from the range of 0° C. to 100° C., the reaction time is preferably selected from the range of 30 minutes to 12 hours, and the concentration of the polysaccharide during the reaction is preferably selected from the range of 0.1 to 50% by mass.

The method for isolating the polysaccharide having the ion exchange group from the reaction solution after completion of the reaction is also not particularly limited, and it is possible to employ a method of removing the solvent by heating to isolate the polysaccharide having an ion exchange group, a method of adding a reaction solution dropwise into a poor solvent to precipitate the polysaccharide having an ion exchange group and collecting it by filtration, and the like.

As the polysaccharide having the ion exchange group, it is possible to obtain a polysaccharide in which the introduced sulfate groups are regenerated types (—$SO_3H$) at the beginning of production, whereas in the present invention, at least some of the regenerated types may be ion-exchanged with alkali metal salt types (—$SO_3M'$ (M' represents an alkali metal (such as lithium, sodium, or potassium))). The above ion exchange from regenerated types to salt types can be carried out by contacting the regenerated type binder with a solution containing alkali metal ions, in the same manner as a normal ion exchanger.

Although not essential, the binder for positive electrode of lithium ion battery of the present invention may contain, as additional binder components other than the above-described polysaccharide having the ion exchange group, polysaccharides having no sulfate group such as alginic acid and carboxymethyl cellulose, or polyvinyl alcohol, polyacrylic acid, polymethacrylic acid, polymaleic acid copolymer, polyfumaric acid, polyitaconic acid, and salts thereof, styrene-butadiene copolymer, and the like.

The binder for positive electrode of lithium ion battery of the present invention may be composed only of the polysaccharide having the ion exchange group, and when additional binder components are contained, the content of the polysaccharide having the ion exchange group is preferably 10% by mass or more.

The amount of the binder blended is preferably 1 to 20% by mass, more preferably 3 to 10% by mass, based on the total amount of the positive electrode active material, the binder and the conductive aid.

The binder of the present invention is highly flexible, and thus can follow the volume change of the positive electrode at the time of charging and discharging, and can prevent the positive electrode from cracking due to the volume change, making it possible to prevent the positive electrode from cracking, the active material from peeling or falling off, and the conductive channel from being broken. Further, the binder of the present invention has outstanding performance as a binder for positive electrode of lithium ion battery, such as excellent affinity with the electrolytic solution which leads to excellent ionic conductivity and excellent oxidation resistance which ensures the stability of the positive electrode.

Furthermore, the binder of the present invention is introduced with at least one functional group selected from the group consisting of sulfate groups and alkali metal sulfate groups, and these functional groups are strongly acidic cation exchange groups, they have a high effect of capturing transition metal ions such as manganese, and thus can capture manganese ions and the like eluted from the positive electrode active material in the vicinity of the positive electrode to suppress precipitation and deposition on the negative electrode. As a result, excellent charge and discharge characteristics and an extended cycle life can be achieved.

In the present invention, the positive electrode active material is not particularly limited as long as lithium ions can be inserted and removed, and examples thereof include transition metal oxides such as CuO, $Cu_2O$, $MnO_2$, $MoO_3$, $V_2O_5$, $CrO_3$, $Fe_2O_3$, $Ni_2O_3$, and $CoO_3$, and lithium composite oxides such as $Li_xCoO_2$, $Li_xNiO_2$, $Li_xMnO_2$, $Li_xMn_2O_4$, $LiNi_xCo_{(1-x)}O_2$, $LiNi_xMn_{(2-x)}O_4$, $LiMn_aNi_bCo_cO_2$ (a+b+c=1), and $LiFePO_4$. Among these, a composite oxide of at least one transition metal selected from transition metals such as Co, Ni, and Mn with lithium is preferable, and specific examples thereof include $LiCoO_2$, $LiNiO_2$, $LiMnO_2$, $LiMn_2O_4$, $LiNi_xCo_{(1-x)}O_2$, $LiNi_xMn_{(2-x)}O_4$ and $LiMn_aNi_bCo_cO_2$ (a+b+c=1). These lithium composite oxides may be doped with a small amount of elements such as fluorine, boron, Al, Cr, Zr, Mo, and Fe, or the surface of particles of the lithium composite oxide may be surface-treated with carbon, MgO, $Al_2O_3$, $SiO_2$, or the like.

The conductive aid contained in the positive electrode is also not particularly limited, and it is possible to use any electronically conductive material that does not adversely affect the battery characteristics. Specific examples thereof include conductive carbons such as Ketjen black and acetylene black, carbon materials such as natural graphite, artificial graphite, carbon whiskers, carbon nanotubes, and carbon fiber powder, metal powders and metal fibers such as Cu, Fe, Ag, Ni, Pd, Au, Pt, In, and W, and conductive metal oxides such as indium oxide and tin oxide. The amount of these conductive aids blended is preferably 1 to 30% by mass based on the positive electrode active material.

The slurry for forming positive electrode mixture layer of lithium ion battery, which is an aspect of the present invention, contains the above binder, positive electrode active material, conductive aid, and water. The slurry may contain a viscosity regulator such as carboxymethyl cellulose and a pH regulator such as an acid or an alkali, if necessary. The solid content concentration of the slurry is not particularly limited, but is preferably 20 to 80% by mass in consideration of the viscosity of the slurry, the dispersibility of the solid content, the load on the drying step, and the like. The ratio of the solid content in the slurry is preferably a positive electrode active material:conductive aid:binder=70 to 98:1 to 30:1 to 20 in terms of mass ratio. The method for producing the slurry is not particularly limited either, and examples thereof include a method in which a binder, a positive electrode active material, and a conductive aid are collectively mixed, dispersed, and dissolved in water to prepare a slurry, a method in which a binder is first dissolved in water, then a positive electrode active material and a conductive aid are added to a binder aqueous solution and mixed to prepare a slurry, a method in which a positive electrode active material is first mixed with a conductive aid and then mixed with a binder aqueous solution to prepare a slurry, and the like. Further, the mixer used for producing a slurry is not particularly limited, and a mortar, a roll mill, a ball mill, a screw mill, a vibration mill, a homogenizer, a rotation and revolution mixer, and the like are used.

The positive electrode for lithium ion battery, which is an aspect of the present invention, contains the above binder. Such a positive electrode for lithium ion battery is preferably composed of a positive electrode mixture layer, obtained by applying the above slurry on a positive electrode current collector and drying it, and a positive electrode current collector. The thickness of the positive electrode mixture layer composed of the positive electrode active material, the binder and the conductive aid is preferably 10 to 200 μm, and in order to form the positive electrode mixture layer of this thickness on the positive electrode current collector, the mass per unit area of the positive electrode mixture layer may be set to 4 to 25 $mg/cm^2$.

The positive electrode current collector may be a conductor whose surface in contact with the positive electrode mixture layer exhibits conductivity, and examples thereof include a conductor formed of metal such as copper, gold, aluminum, titanium, nickel, stainless steel, or an alloy thereof, or a conductive metal oxide such as indium oxide or tin oxide, or a conductive material such as conductive carbon. The shape of the positive electrode current collector is not particularly limited, and it is possible to employ shapes such as foil, film, sheet, net, expanded metal, punched metal, and foam. The thickness of the positive electrode current collector is also not particularly limited, and is preferably about 1 to 100 μm.

The method for manufacturing the positive electrode for lithium ion battery is not particularly limited, and the slurry can be coated on the positive electrode current collector and dried. The method for applying a slurry is not particularly limited either, and it is possible to use methods such as slit coat, die coat, roll coat, dip coat, blade coat, knife coat, and wire bar coat. The drying method and conditions are not particularly limited either, and it is possible to use a normal warm air circulation type dryer, a vacuum dryer, an infrared dryer, and a microwave heating dryer. The heating temperature is not limited either, and it can be heated and dried at 50 to 150° C. Further, the porous structure can be made uniform by pressing the positive electrode during or after drying.

The lithium ion battery, which is an aspect of the present invention, has the above positive electrode for lithium ion battery. By using the positive electrode for lithium ion battery, it is possible to provide a high-performance lithium ion battery that has achieved excellent charge and discharge characteristics and an extended cycle life. A lithium ion battery is generally composed of a positive electrode, a negative electrode, a separator, a non-aqueous electrolytic solution, and the like. The positive electrode is obtained by binding the above-mentioned positive electrode active material together with the above-mentioned conductive aid onto the positive electrode current collector using a binder, and has a structure in which a positive electrode mixture layer, composed of a positive electrode active material, a binder, and a conductive aid, is formed on a current collector. The negative electrode also has a structure similar to that of the positive electrode, and the following negative electrode active material and the above conductive aid are bound onto the negative electrode current collector using a binder. As the separator, a porous film such as polyolefin is generally used, and it is sandwiched between the positive electrode and the negative electrode because it has a shutdown function when the battery has a thermal runaway. The non-aqueous electrolyte solution is obtained by dissolving an electrolyte salt such as $LiPF_4$ in an organic solvent such as a cyclic carbonate. The inside of the battery is filled with a non-aqueous electrolytic solution, and lithium ions move from the positive electrode to the negative electrode during charging and from the negative electrode to the positive electrode during discharging.

The negative electrode used in the lithium ion battery of the present invention is not particularly limited, and can be produced using a known material. The negative electrode is composed of a negative electrode mixture layer composed of a negative electrode active material, a conductive aid and a binder, and a current collector.

As the negative electrode active material, it is possible to use any material capable of inserting and removing lithium ions, examples thereof include carbon-based materials such as natural graphite, artificial graphite, non-graphitizable carbon, and graphitizable carbon, silicon-based materials such as silicon, silicon alloys, and silicon oxide, tin-based materials such as tin and tin alloys, and lithium metal and alloys thereof.

As the conductive aid for the negative electrode, the same conductive aid as the conductive aid exemplified for the positive electrode can be used.

As the binder for the negative electrode, a known binder may be used, and it is possible to use fluororesins such as polyvinylidene fluoride, vinylidene fluoride-hexafluoropropylene copolymers, perfluoro methyl vinyl ether-tetrafluoroethylene copolymers, polytetrafluoroethylene, and fluoro rubber, hydrocarbon-based elastomers such as styrene-butadiene copolymers and ethylene-propylene copolymers, polysaccharides such as carboxymethyl cellulose, alginic acid and sodium alginate, polyimides, and the like.

As the negative electrode current collector, it is possible to use the same current collector as the current collector exemplified for the positive electrode.

The non-aqueous electrolytic solution is not particularly limited either, and known materials can be used. The non-aqueous electrolyte solution is obtained by dissolving an electrolyte salt in an organic solvent, and examples of the electrolyte salt include $CF_3SO_3Li$, $(CF_3SO_2)_2NLi$, $(CF_3SO_2)_2CLi$, $LiBF_4$, $LiB(C_6H_8)_4$, $LiPF_4$, $LiClO_4$, $LiAsF_6$, LiCl, LiBr, and the like. Examples of the organic solvent for dissolving the electrolyte salt include ethylene carbonate, vinylene carbonate, propylene carbonate, butylene carbonate, dimethyl carbonate, diethyl carbonate, ethylmethyl carbonate, 1,2-dimethoxyethane, 1,2-diethoxyethane, γ-butyrolactone, tetrahydrofuran, 1,4-dioxane, anisole, diethyl ether, sulfolane, methyl sulfolane, acetonitrile, propionitrile, butyronitrile, valeronitrile, benzonitrile, dimethylformamide, dimethylsulfoxide, trimethyl phosphate, triethyl phosphate, and the like. The concentration of the electrolyte salt in the non-aqueous electrolytic solution can be selected in the range of 0.1 to 5 mol/L, preferably 0.5 to 3 mol/L.

The separator is not particularly limited either, and a known separator can be used. Examples of the separator include a polyethylene microporous membrane, a polypropylene microporous membrane, a stacked membrane of a polyethylene microporous membrane and a polypropylene microporous membrane, and a non-woven fabric made of polyester fiber, aramid fiber, glass fiber, or the like.

EXAMPLES

Example 1

Hereinafter, the present invention is described in more detail based on Examples, but the present invention is not limited to these Examples.

Production of Sulfated Polysaccharides

(Reference Example 1) Production of Sulfated Alginic Acid

To 150 ml of dimethyl sulfoxide (hereinafter abbreviated as DMSO), 3.0 g (17 mmol as a monosaccharide unit) of H-alginic acid (manufactured by Kimica Corporation under the trade name of Kimica Acid SA) was added little by little and uniformly dispersed. Then, 6.75 g (42.5 mmol) of sulfur trioxide pyridine complex was added to the dispersion liquid under stirring, uniformly dispersed, then heated to 40° C., and reacted at 40° C. for 5 hours. Alginic acid dissolved as the reaction progressed and became a uniform solution at the end of the reaction. After completion of the reaction, the reaction solution was added dropwise to ethanol, the precipitated products were collected with a glass filter, washed with ethanol, and then dried under reduced pressure at room temperature to isolate the products. The isolated yield was 5.0 g, and the sulfur content determined by elemental analysis was 10.1% by mass, and the weight average molecular weight measured by gel permeation chromatography (GPC) was 48,000. The amount of sulfate groups introduced calculated from the sulfur content was 3.2 mmol/g.

(Reference Example 2) Production of Sulfated Alginic Acid Ester

A sulfated alginic acid ester was produced by the same operations as in Reference Example 1 except that 3.0 g (13 mmol as a monosaccharide unit) of alginic acid ester (manufactured by Kimica Corporation under the trade name of Kimiroid HV) was used in place of H-alginic acid and that 5.25 g (33 mmol) of sulfur trioxide pyridine complex was added. The yield of the resulting sulfated alginic acid ester was 4.3 g, and the sulfur content determined by elemental analysis was 9.2% by mass, and the weight average molecular weight measured by GPC was 310,000. The amount of sulfate groups introduced calculated from the sulfur content was 2.9 mmol/g.

(Reference Example 3) Production of Sulfated Carboxymethyl Cellulose

To 150 ml of dimethyl sulfoxide (hereinafter abbreviated as DMSO), 3.0 g (13 mmol as a monosaccharide unit) of carboxymethyl cellulose (manufactured by Daicel Miraizu Ltd., product number 1220, degree of etherification 0.8 to 1.0) was added little by little under stirring and uniformly dispersed. Then, 6.0 g (37.8 mmol) of sulfur trioxide pyridine complex was added to the dispersion liquid under stirring, uniformly dispersed, then heated to 40° C., and reacted at 40° C. for 3 hours. Carboxymethyl cellulose dissolved as the reaction progressed and became a uniform solution at the end of the reaction. After completion of the reaction, the reaction solution was added dropwise to ethanol, the precipitated products were collected with a glass filter, washed with ethanol, and then dried under reduced pressure at room temperature to isolate the products. The isolated yield was 4.7 g, and the sulfur content determined by elemental analysis was 12.1% by mass, and the weight average molecular weight measured by gel permeation chromatography (GPC) was 50,000. The amount of sulfate groups introduced calculated from the sulfur content was 3.8 mmol/g.

(Reference Example 4) Production of Sulfated Guar Gum

Sulfated guar gum was produced by the same operations as in Reference Example 3 except that 3.0 g (6 mmol as a monosaccharide unit) of guar gum (manufactured by SOMAR Corporation under the trade name of PROCOL S-1) was used in place of carboxymethyl cellulose and that the reaction time was set to 5 hours. The yield of the resulting sulfated guar gum was 3.9 g, and the sulfur content determined by elemental analysis was 6.6% by mass, and the weight average molecular weight measured by GPC was 450,000. The amount of sulfate groups introduced calculated from the sulfur content was 2.1 mmol/g.

Production of Coin Cells

Example 1

First, a positive electrode mixture was prepared from the following materials to prepare a positive electrode.

Positive electrode active material: 80 parts by mass of lithium nickel manganese composite oxide (LNMO: $LiNi_{0.5}Mn_{1.5}O_4$)

Conductive aid: 10 parts by mass of acetylene black (AB: Li-400 manufactured by Denka Company Limited)

Binder: 10 parts by mass of sulfated alginic acid (Reference Example 1).

Sulfated alginic acid was neutralized with a 1 mol/L lithium hydroxide aqueous solution to prepare a sulfated lithium alginate aqueous solution. LNMO and AB were mixed in advance in a mortar, mixed with the above-mentioned sulfated lithium alginate aqueous solution, and mixed again in a mortar to prepare a positive electrode mixture slurry. Then, the slurry was coated on an aluminum foil using a doctor blade, dried at 80° C. for 24 hours, and further dried under reduced pressure at 80° C. for 24 hours to prepare a positive electrode.

Next, the resulting positive electrode was used to produce a coin cell as follows. Specifically, a lithium metal foil was used for the negative electrode, and lithium hexafluorophosphate was dissolved in an ethylene carbonate/dimethyl carbonate (1/1) mixed solvent so as to have a concentration of 1 mol/L to prepare an electrolytic solution. Note that a polyolefin microporous membrane (manufactured by Toray Industries, Inc., thickness 20 μm) was used as the separator. Then, the positive electrode and the negative electrode were arranged on both sides of the separator, stacked, and injected with an electrolytic solution to prepare a type 2032 coin cell.

Example 2

A coin cell was produced by the same operations as in Example 1 except that the sulfated alginic acid ester obtained in Reference Example 2 was used as a binder.

Example 3

A coin cell was produced by the same operations as in Example 1 except that the sulfated carboxymethyl cellulose obtained in Reference Example 3 was used as a binder and that the composition of the positive electrode mixture was changed such that lithium nickel-manganese composite oxide (LNMO) was 87 parts by mass, the conductive aid (AB) was 10 parts by mass, and the binder (sulfated carboxymethyl cellulose (Reference Example 3)) was 3 parts by mass.

Example 4

A coin cell was produced by the same operations as in Example 1 except that the sulfated guar gum obtained in Reference Example 4 was used as a binder.

Comparative Example 1

A coin cell was prepared by the same operations as in Example 1 except that PVDF (manufactured by Polysciences Inc., Catalog No. 18734-100) was used as a binder and that N-methyl-2-pyrrolidone was used as a solvent to prepare a positive electrode mixture slurry.

Comparative Example 2

A coin cell was produced by the same operations as in Example 1 except that H-alginic acid (manufactured by Kimica Corporation under the trade name of Kimica Acid SA) was used as a binder.

Comparative Example 3

A coin cell was produced by the same operations as in Example 1 except that an alginic acid ester (manufactured by Kimica Corporation under the trade name of Kimiroid HV) was used as a binder.

Comparative Example 4

A coin cell was produced by the same operations as in Example 1 except that carboxymethyl cellulose (manufactured by Daicel Miraizu Ltd., product number 1220, degree of etherification 0.8 to 1.0) was used as a binder and that the composition of the positive electrode mixture was changed such that lithium nickel-manganese composite oxide (LNMO) was 87 parts by mass, the conductive aid (AB) was 10 parts by mass, and the binder (carboxymethyl cellulose) was 3 parts by mass.

Comparative Example 5

A coin cell was produced by the same operations as in Example 1 except that guar gum (manufactured by SOMAR Corporation under the trade name of PROCOL S-1) was used as a binder.

<Evaluation of Charge and Discharge Characteristics>

The coin cells obtained in Examples 1 and 2 and Comparative Examples 1 to 3 were used to evaluate the charge and discharge characteristics under the following conditions.

Charge: Constant current (CC mode)

Discharge: Constant current (CC mode)

Potential range: 3.5 to 5.0 V

Current density: 20 mA/g.

Under the above conditions, charging and discharging were performed for 50 cycles. FIGS. 1 to 5 show the results. Note that each number in the figures represent cycle number. FIGS. 1 and 2 are charge and discharge curves of the coin cells obtained in Example 1 and Example 2, respectively, showing that even after 50 cycles, the decrease in discharge capacity is slight, and the relationship between the discharge capacity and the electrode voltage at each cycle is stable. Meanwhile, FIG. 3 shows the charge and discharge curve of the coin cell obtained in Comparative Example 1, where a decrease in the discharge capacity was observed as the cycle number increased. Further, FIG. 4 shows the charge and discharge curve of the coin cell obtained in Comparative Example 2, where a decrease in the discharge capacity was observed after 30 cycles or more. Moreover, FIG. 5 shows a charge and discharge curve of the coin cell obtained in Comparative Example 3, where a decrease in the discharge capacity was observed as the cycle number increased, as compared with FIG. 1 (Example 1). From these results, the system using the sulfated lithium alginate according to the present invention as the binder (FIG. 1, Example 1) was capable of more stable charging and discharging than the system using PVDF or lithium alginate as the binder. Further, the system using the sulfated alginic acid ester (sulfated alginic acid ester lithium salt) according to the present invention as the binder (FIG. 2, Example 2) was also capable of more stable charging and discharging than the system using PVDF or alginic acid ester (alginic acid ester lithium salt) as the binder.

FIG. 6 is a graph showing the charge and discharge cycle characteristics of the coin cells obtained in Example 1, Comparative Example 1, and Comparative Example 2, and shows the transition of the discharge capacity according to the cycle number. It was confirmed from these results that the system of Example 1 using the sulfated lithium alginate according to the present invention as a binder was capable of stable charging and discharging without a decrease in discharge capacity even when the cycle number increased, whereas the systems of Comparative Example 1 and Comparative Example 2 using PVDF and lithium alginate as binders met with a decrease in discharge capacity as the cycle number increased.

Next, in order to evaluate the rate characteristics, the charge rate and the discharge rate were denoted by C/10, C/5, C/2, 1 C, and 2 C, and the discharge capacities of the coin cells obtained in Example 1, Comparative Example 1, and Comparative Example 2 were measured. FIG. 7 shows the results, where in the system of Example 1 using the sulfated lithium alginate according to the present invention as a binder, the decrease in discharge capacity was small even when the rate was increased, whereas in the system of Comparative Example 1 using PVDF as a binder, the discharge capacity decreased significantly as the rate increased. Further, the system of Comparative Example 2 using lithium alginate as a binder also met with a decrease in discharge capacity, though not as much as in Comparative Example 1.

FIG. 8 is a graph showing the charge and discharge cycle characteristics of the coin cells obtained in Example 2, Comparative Example 1, and Comparative Example 3, and shows the transition of the discharge capacity according to the cycle number. It was confirmed from these results that the system of Example 2 using the sulfated alginic acid ester (sulfated alginic acid ester lithium salt) according to the present invention as a binder was capable of stable charging and discharging without a decrease in discharge capacity even when the cycle number increased, whereas the systems of Comparative Example 1 and Comparative Example 2 using PVDF and alginic acid ester (alginic acid ester lithium salt) as binders met with a decrease in discharge capacity as the cycle number increased.

Next, in order to evaluate the rate characteristics, the charge rate and the discharge rate were denoted by C/10, C/5, C/2, 1 C, and 2 C, and the discharge capacities of the coin cells obtained in Example 2, Comparative Example 1, and Comparative Example 3 were measured. FIG. 9 shows the results, where in the system of Example 2 using the sulfated alginic acid ester (sulfated alginic acid ester lithium salt) according to the present invention as a binder, the decrease in discharge capacity was small even when the rate was increased, whereas in the system of Comparative Example 1 using PVDF as a binder, the discharge capacity decreased significantly as the rate increased. Further, the system of Comparative Example 3 using alginic acid ester (alginic acid ester lithium salt) as a binder also met with a decrease in discharge capacity, though not as much as in Comparative Example 1.

Next, the coin cells obtained in Examples 3 and 4 and Comparative Examples 4 and 5 were used to evaluate the charge and discharge characteristics under the following conditions.

Charge: Constant current (CC mode)

Discharge: Constant current (CC mode)

Potential range: 3.5 to 5.0 V

Current density: 20 mA/g.

FIG. 10 shows the charge and discharge cycle characteristics of the coin cells obtained in Example 3 and Comparative Example 4. From these results, the system of Example 3 using the sulfated carboxymethyl cellulose lithium according to the present invention as a binder was capable of stable charging and discharging without a decrease in discharge capacity even when the cycle number increased, whereas the system of Comparative Example 4 using carboxymethyl cellulose lithium not introduced with sulfate groups as a binder met with a significant decrease in discharge capacity as the cycle number increased.

Next, FIG. 11 shows the charge and discharge cycle characteristics of the coin cells obtained in Example 4 and Comparative Example 5. From these results, the system of Example 4 using the sulfated guar gum lithium according to the present invention as a binder was capable of stable charging and discharging without a decrease in discharge capacity even when the cycle number increased, whereas the system of Comparative Example 5 using guar gum lithium not introduced with sulfate groups as a binder had a lower discharge capacity than Example 4, and met with some decrease in discharge capacity as the cycle number increased.

<Adhesiveness Evaluation>

In the above charge and discharge characteristic evaluation, the appearance of the positive electrodes in Example 1, Comparative Example 1, and Comparative Example 2 after the 50-cycle charge and discharge test was observed using a scanning electron microscope (SEM). FIG. 12 shows the results, where there was a big crack in the surface of the positive electrode mixture layer of the positive electrode of Comparative Example 1 (a-1 and a-2), and there were many small cracks in the surface of the positive electrode mixture layer of the positive electrode of Comparative Example 2 (b-1 and b-2). In contrast, there were fewer cracks in the surface of the positive electrode mixture layer of the positive electrode of Example 1 (c-1 and c-2). It was confirmed from these results that the sulfated lithium alginate according to the present invention used for the binder in Example 1 had higher adhesiveness to the positive electrode active material, the conductive aid, and the current collector, as compared with the PVDF and unmodified lithium alginate used in the Comparative Examples.

INDUSTRIAL APPLICABILITY

As described above, the present invention makes it possible to provide a binder for positive electrode of lithium ion battery and a slurry for forming positive electrode mixture layer of lithium ion battery, which are excellent in workability at the time of producing a positive electrode, is excellent in charge and discharge characteristics such as cycle characteristics and rate characteristics, and enables to produce a positive electrode having an extended cycle life, and furthermore, the use thereof makes it possible to provide a positive electrode for lithium ion battery and a lithium ion battery having excellent charge and discharge characteristics and an extended cycle life.

The invention claimed is:

1. A binder for positive electrode of lithium ion battery, comprising:

a polysaccharide having at least one ion exchange group selected from the group consisting of sulfate groups and alkali metal sulfate groups, wherein the polysaccharide having the ion exchange group is at least one selected from the group consisting of sulfated alginic acid, sulfated alginate alkali metal salts, sulfated alginic acid ester, sulfated alginic acid ester alkali metal salts, sulfated carboxymethyl cellulose, sulfated carboxymethyl cellulose alkali metal salts, sulfated guar gum, and sulfated guar gum alkali metal salts, the binder can bind a positive electrode active material, a conductive aid and a current collector at the positive electrode of lithium ion battery, and the polysaccharide having the ion exchange group has been neutralized with lithium hydroxide aqueous solution.

2. The binder according to claim 1, wherein a weight average molecular weight of the polysaccharide having the ion exchange group is 10,000 to 1,000,000, and the amount of the ion exchange group introduced into the polysaccharide is 1.0 to 6.0 mmol/g.

3. The binder according to claim 1, wherein the polysaccharide having the ion exchange group has a structure represented by the following general formula (1)

[Chem. 1]

(1)

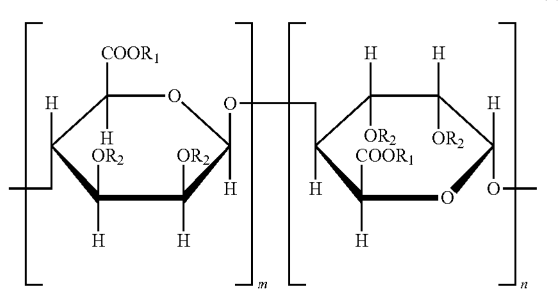

(in the formula, m and n each independently represent integers of 1 or more, $R_1$'s may be the same or different and each represent one selected from the group consisting of a hydrogen atom, alkali metals, alkaline earth metals, and groups represented by —$R_3$—O—$R_2$, and $R_3$ represents a divalent hydrocarbon group having 2 to 6 carbon atoms, $R_2$'s may be the same or different and each represent one selected from the group consisting of a hydrogen atom and groups represented by —$SO_3M$ (M represents one selected from the group consisting of a hydrogen atom and alkali metals), and at least one of $R_2$'s is the group represented by —$SO_3M$).

4. The binder according to claim 1, wherein the polysaccharide having the ion exchange group has been neutralized with a 1 mol/L lithium hydroxide aqueous solution.

5. A slurry for forming positive electrode mixture layer of lithium ion battery, comprising: a positive electrode active material, a conductive aid, the binder according to claim 1, and water.

6. A positive electrode for lithium ion battery, comprising: the binder according to claim 1.

7. A lithium ion battery comprising: the positive electrode for lithium ion battery according to claim 6.

* * * * *